United States Patent
Picon Ruiz et al.

(10) Patent No.: US 12,468,943 B2
(45) Date of Patent: Nov. 11, 2025

(54) SYSTEM AND METHOD FOR ESTIMATING VEGETATION COVERAGE IN A REAL-WORLD ENVIRONMENT

(71) Applicant: BASF SE, Ludwigshafen am Rhein (DE)

(72) Inventors: Artzai Picon Ruiz, Derio (ES); Miguel Gonzalez San Emeterio, Derio (ES); Aranzazu Bereciartua-Perez, Derio (ES); Laura Gomez Zamanillo, Derio (ES); Carlos Javier Jimenez Ruiz, Seville (ES); Javier Romero Rodriguez, Seville (ES); Christian Klukas, Limburgerhof (DE); Till Eggers, Ludwigshafen am Rhein (DE); Jone Echazarra Huguet, Derio (ES); Ramon Navarra-Mestre, Limburgerhof (DE)

(73) Assignee: BASF SE, Ludwigshafen am Rhein (DE)

( * ) Notice: Subject to any disclaimer, the term of this patent is extended or adjusted under 35 U.S.C. 154(b) by 407 days.

(21) Appl. No.: 17/925,250

(22) PCT Filed: May 7, 2021

(86) PCT No.: PCT/EP2021/062178
§ 371 (c)(1),
(2) Date: Nov. 14, 2022

(87) PCT Pub. No.: WO2021/233698
PCT Pub. Date: Nov. 25, 2021

(65) Prior Publication Data
US 2023/0230373 A1    Jul. 20, 2023

(30) Foreign Application Priority Data
May 22, 2020 (EP) .................................. 20176124

(51) Int. Cl.
*G06N 3/08* (2023.01)
*G06T 7/12* (2017.01)
(Continued)

(52) U.S. Cl.
CPC ................. *G06N 3/08* (2013.01); *G06T 7/12* (2017.01); *G06V 10/143* (2022.01);
(Continued)

(58) Field of Classification Search
CPC .... G06V 10/82; G06V 10/761; G06V 10/143; G06V 10/764; G06V 20/188;
(Continued)

(56) References Cited

FOREIGN PATENT DOCUMENTS

| EP | 2 579 211 A2 | 4/2013 |
| WO | 2019/108170 A1 | 6/2019 |

OTHER PUBLICATIONS

Suárez, Patricia L., et al. "Image vegetation index through a cycle generative adversarial network." Proceedings of the IEEE/CVF Conference on Computer Vision and Pattern Recognition Workshops. 2019. (Year: 2019).*

(Continued)

*Primary Examiner* — Vu Le
*Assistant Examiner* — Tracy Mangialaschi
(74) *Attorney, Agent, or Firm* — ArentFox Schiff LLP

(57) ABSTRACT

Computer-implemented method and system (100) for estimating vegetation coverage in a real-world environment. The system receives an RGB image (91) of a real-world scenery (1) with one or more plant elements (10) of one or more plant species. At least one channel of the RGB image (91) is provided to a semantic regression neural network (120) which is trained to estimate at least a near-infrared channel (NIR) from the RGB image. The system obtains an estimate of the near-infrared channel (NIR) by applying the semantic regression neural network (120) to the at least one (Continued)

RGB channel (91). A multi-channel image (92) comprising at least one of the R-, G-, B-channels (R, G, B) of the RGB image and the estimated near-infrared channel (NIR), is provided as test input (TI1) to a semantic segmentation neural network (130) trained with multi-channel images to segment the test input (TI1) into pixels associated with plant elements and pixels not associated with plant elements. The system segments the test input (TI1) using the semantic segmentation neural network (130) resulting in a vegetation coverage map (93) indicating pixels of the test input associated with plant elements (10) and indicating pixels of the test input not associated with plant elements.

12 Claims, 10 Drawing Sheets

(51) Int. Cl.
- *G06V 10/143* (2022.01)
- *G06V 10/74* (2022.01)
- *G06V 10/764* (2022.01)
- *G06V 10/82* (2022.01)
- *G06V 20/10* (2022.01)

(52) U.S. Cl.
CPC .......... *G06V 10/761* (2022.01); *G06V 10/764* (2022.01); *G06V 10/82* (2022.01); *G06V 20/188* (2022.01); *G06T 2207/10024* (2013.01)

(58) Field of Classification Search
CPC .......... G06N 3/048; G06N 3/045; G06N 3/08; G06N 3/047; G06T 7/12; G06T 2207/10024; G06F 18/24133
See application file for complete search history.

(56) References Cited

OTHER PUBLICATIONS

Potena, Ciro, Daniele Nardi, and Alberto Pretto. "Fast and accurate crop and weed identification with summarized train sets for precision agriculture." Intelligent Autonomous Systems 14: Proceedings of the 14th International Conference IAS-14 14. Springer International Publishing, 2017. (Year: 2017).*

Reyes, Angie K., Juan C. Caicedo, and Jorge E. Camargo. "Fine-tuning Deep Convolutional Networks for Plant Recognition." CLEF (Working Notes) 1391.9 (2015). (Year: 2015).*

Hartling, Sean, et al. "Urban tree species classification using a WorldView-2/3 and LiDAR data fusion approach and deep learning." Sensors 19.6 (2019): 1284. (Year: 2019).*

Luo, Haifeng, et al. "High-resolution aerial images semantic segmentation using deep fully convolutional network with channel attention mechanism." IEEE journal of selected topics in applied earth observations and remote sensing 12.9 (2019): 3492-3507. (Year: 2019).*

International Search Report of International Application No. PCT/EP2021/062178 mailed Jul. 19, 2021, 11 pgs.

Suarez Patricia L et al., "Image Vegetation Index Through a Cycle Generative Adversarial Network", 2019 IEEE/CVF Conference on Computer Vision and Pattern Recognition Workshops (CVPRW), IEEE, Jun. 16, 2019 (Jun. 16, 2019), pp. 1014-1021.

Grover, Prince, "5 Regression Loss Functions All Machine Learners Should Know", downloaded from https://heartbeat.comet.ml/5-regression-loss-functions-all-machine-learners-should-know-4fb140e9d4b0, Jun. 5, 2018, 19 pgs.

Bannari et al., "A review of vegetation indices", Remote sensing reviews, vol. 13, No. 1-2, 256 pp. 95-120, 1995.

Isola et al., "Image-to-Image Translation with Conditional Adversarial Networks", A. A. (2017), Proceedings of the IEEE conference on computer vision and pattern recognition, pp. 1125-1134.

Diederik et al., "Adam: A method for stochastic optimization", arXiv:1412.6980v9 Jan. 30, 2017, 15 pgs.

Zhao et al., "Pyramid Scene Parsing Network", 2017, in Proceedings of the IEEE conference on computer vision and pattern recognition, pp. 2881-2890.

* cited by examiner a1)

a2)

b1)

b2)

c1)

c2)

d1)

d2)

e1)

e2)

f1)

f2)

f3)

g1)

g2)

g3)

h1)

h2)

h3)

i1)

i2)

i3)

| Image channels | # Channels | AuC | BAC | Sensitivity | Specificity | NPV | PPV | F1 |
|---|---|---|---|---|---|---|---|---|
| NIR | 1 | 0.977 | 0.924 | 0.926 | 0.922 | 0.981 | 0.741 | 0.823 |
| NDVI | 1 | 0.991 | 0.958 | 0.967 | 0.950 | 0.992 | 0.823 | 0.889 |
| IDCS | 1 | 0.996 | 0.974 | 0.982 | 0.966 | 0.995 | 0.874 | 0.925 |
| IDCR | 1 | 0.992 | 0.964 | 0.972 | 0.956 | 0.993 | 0.841 | 0.902 |
| RGB | 3 | 0.992 | 0.962 | 0.967 | 0.958 | 0.992 | 0.848 | 0.904 |
| RGB+NIR | 4 | 0.997 | 0.978 | 0.982 | 0.974 | 0.996 | 0.901 | 0.940 |
| RGB+NDVI | 4 | 0.997 | 0.977 | 0.980 | 0.973 | 0.995 | 0.900 | 0.939 |
| RGB+IDCS | 4 | 0.995 | 0.967 | 0.964 | 0.969 | 0.992 | 0.878 | 0.919 |
| RGB+IDCR | 4 | 0.998 | 0.981 | 0.986 | 0.974 | 0.997 | 0.903 | 0.943 |
| RGB+NIR+NDVI+IDCS+IDCR | 7 | 0.998 | 0.980 | 0.980 | 0.996 | 0.914 | 0.913 | 0.946 |
| RGB+NIR+IDCS+IDCR | 6 | 0.998 | 0.984 | 0.988 | 0.980 | 0.997 | 0.919 | 0.952 |
| RGB+learnt channels | 3* | 0.992 | 0.963 | 0.961 | 0.965 | 0.991 | 0.860 | 0.908 |

SYSTEM AND METHOD FOR ESTIMATING VEGETATION COVERAGE IN A REAL-WORLD ENVIRONMENT

CROSS-REFERENCE TO RELATED APPLICATIONS

This application is a national stage entry under 35 U.S.C. § 371 of International Application No. PCT/EP2021/062178, filed on May 7, 2021, which claims the benefit of priority of European Application No. 20176124.4, filed on May 22, 2020, the disclosures of which are hereby incorporated by reference herein in their entireties.

TECHNICAL FIELD

The present invention generally relates to electronic data processing, and more particularly, relates to image processing methods, computer program products and systems for estimating vegetation coverage in a real-world environment.

BACKGROUND

Vegetation coverage map estimation is of importance to assess crop status in agricultural fields, the effect of nutrients, the evaluation of the stress situation in a crop or the effect of existing agricultural practices. A vegetation coverage map of a particular area illustrates which parts of the surface of said particular are covered by plants growing in the particular area versus such parts of the surface not covered by plants (e.g., soil, water, buildings, etc.)

The most precise estimate for vegetation coverage can be obtained by respective biomass measurement which is a time-consuming and destructive process where one or more individual plant samples are taken out of a field plot to be weighted. Such plant samples are not replanted again which makes such a procedure incompatible with farming practice. For monitoring an area in a statistically unbiased way, lots of individual plant samples must be analyzed with the effects that such samples are lost for the vegetation later on. Therefore, there is a need for a non-destructive technique for measuring biomass that can be quickly executed (near real-time execution) and extensively applied.

SUMMARY

The herein disclosed solution to this technical problem is based on image analysis as a non-destructive method which can be extensively applied, for example by mounting a camera on a drone, in a robot or in a tractor or in a handheld device to record images of a real-world scenery which is at least partially covered by plants. Even satellite images are becoming more accessible providing vegetation coverage information. However, technical issues of processing and analyzing features of plant elements (e.g., crop leaves or the like) are challenging with regards to the precision of the imaging-based estimation models.

Traditionally, vegetation index calculations [A. Bannari, D. Morin, F. Bonn, and A. Huete, "A review of vegetation indices," Remote sensing reviews, vol. 13, no. 1-2, 256 pp. 95-120, 1995.] have been used for visual vegetation coverage estimation. Leaves cause particularly low reflectance on the visible light range (450-750 nm) except for the fairly small window of the visible spectrum which is the green color around 550 nm, the signature reflectance of chlorophyll. The rest of the visible wavelengths have minor representation in the spectra of the reflected light. Therefore, it can be advantageous to define vegetation indexes to find indicators for the presence of biomass by combining more spectral wavelengths than just the wavelengths of the visible range. For example, leaf mesophyll—which can be perceived as leaf fleshy tissue—reflects low light in the visible spectrum, but has a major contribution to near-infrared (NIR). The near-infrared spectral range as referred to herein ranges from 750 nm to 3000 nm and covers the spectral ranges IR-A and IR-B [cf. Strahlungsphysik im optischen Bereich and Lichttechnik; Benennung der Wellenlängenbereiche. In: Deutsches Institut für Normung (Hrsg.): DIN. 5031 Teil 7, January 1984]. Moreover, NIR radiation can penetrate the vegetal canopy from the upper leaves to the lower ones, which makes the actual structure determinant to the final NIR reflectance. The canopy structure is composed of several factors such as leaf thickness, overlapping, height and growth habit among others. Therefore, NIR is considered to be well suited for estimating vegetal biomass.

The herein disclosed embodiments of a computer-implemented method, a computer program product and a computer system for estimating vegetation coverage in a real-world environment, are based on two neural networks implementing an image processing tool for estimating vegetation coverage. Thereby, a first neural network is used to derive a near-infrared (NIR) channel from an RGB image of a real-world scenery which comprises one or more plant elements of one or more plants growing in the real-world scenery. The one or more plants can be of one or more plant species. The RGB color model is an additive color model in which red, green, and blue light are added together in various ways to reproduce a broad array of colors. A second neural network is trained on a training dataset comprising such multi-channel images including the R-, G-, and B-channels of RGB images and the respective derived NIR channel. This second neural network is then used to segment a multi-channel image test input into pixels associated with plants (biomass) and into pixels not associated with plants.

In more detail, the computer system receives the RGB image which is subject to the vegetation coverage estimation via an appropriate interface. For example, the RGB image can be recorded by a standard digital camera device which may be integrated in a handheld computing device (e.g., a smartphone or tablet computer), or which may be mounted on a vehicle, a drone, a plane, or even a satellite.

At least one channel (R, G, B) of the received RGB image is then provided to the first neural network which is a semantic regression neural network. The semantic regression neural network has been trained to estimate at least an NIR channel from the at least one RGB channel with an appropriate training dataset that includes a plurality of images with real-world sceneries. The images of the training dataset are advantageously recorded by a multispectral camera which provides R-, G-, B- and NIR channels for each training image. Alternatively, an RGB camera and an NIR camera may record separate images from the same view point which are then merged into a single RGB-NIR image. Each training image includes representations of at least some elements of one or more plants. The semantic regression neural network has a topology based on a convolutional segmentation neural network with its last layer being substituted by a monotonic activation function and its loss function being substituted by a regression loss function. A person skilled in the art of machine learning knows how to perform such substitutions to implement the convolutional segmentation neural network such that it learns a pixel-wise regression transformation that transforms any RGB channel from an RGB domain to a target domain comprising at least a near-infrared domain.

Example implementations of the monotonic activation function comprise (but are not limited to) any of: linear, sigmoid or hyperbolic tangent, and example implementations of the regression loss function comprise (but are not limited to) any of: Mean Square Error, Mean Absolute Error, Huber Loss, Log-Cosh Loss, and Quantile Loss. It is to be noted that each of monotonic activation functions can be combined with each of the regression loss functions. Further, a person skilled in the art of neural networks may use any other suitable monotonic activation function and may combine it with any other suitable regression loss function.

In one embodiment, the regression loss function can be further enhanced by an adversarial perceptual loss function following a pix2pix architecture (cf. Isola, P., Zhu, J. Y., Zhou, T., & Efros, A. A. (2017). In other words, the regression loss function may be combined with the adversarial perceptual loss function where the loss is determined as a weighted sum of the regression loss and the adversarial perceptual loss. Image-to-image translation with conditional adversarial networks. In Proceedings of the IEEE conference on computer vision and pattern recognition, pp. 1125-1134). The addition of the perceptual adversarial loss functions ensures that the generated NIR image is visually plausible and cannot be distinguished by a respectively trained neural network from a real image.

The output obtained by the semantic regression neural network when applied to the received RGB image is an estimate of the NIR channel. This output represents a multi-channel image which includes at least one of the R-, G-, B-channels of the RGB image and the estimated NIR channel. This multi-channel image is then provided as test input to the second neural network which is a semantic segmentation neural network. The semantic segmentation neural network has been trained with a training data set which includes a plurality of multi-channel images of the test input type. Test input type—as used herein—refers to the type of the test input with regards to the composition of channels in the multi-channel image. In other words, the outputs generated by the first neural network for its training dataset may serve as the training dataset of the second neural network. The semantic segmentation neural network is trained to segment a multi-channel image into pixels associated with plant elements and pixels not associated with plant elements. It is to be noted that the quality of this segmentation improves with the number of channels present in the multi-channel image.

Once the semantic segmentation neural network receives as test input the multi-channel image generated by the first neural network for the received RGB image, the semantic segmentation neural network segments the test input resulting in a vegetation coverage map. The vegetation coverage map indicates pixels of the test input associated with plant elements and indicates pixels of the test input not associated with plant elements. For example, the two classes (plant vs. no-plant) may be indicated by different colors of the pixels.

The proposed segmentation method on the basis of R-G-B-NIR multi-channel images (including at least one of the R-, G-, B-channels plus the NIR channel) with the semantic segmentation neural network, which has been trained accordingly, allows to identify from an original RGB image such pixels which belong to areas in a real-world scenery which are covered by plants. The image segmentation is a non-destructive technique for measuring biomass coverage in near real-time providing a reliable high accuracy measure of the vegetation coverage in the form of vegetation coverage maps for the respective test inputs.

In one embodiment, the multi-channel image can be enhanced by adding further channels leading to an improved segmentation result of the second neural network even in situations where the plant elements on the original RGB image show damage symptoms. Plat portions showing such damage symptoms (e.g., white or brown spots) may not be segmented into pixels associated with plants but may end up in the class of pixels not associated with plants because they may be confused with soil or other background related pixels by the second network. This technical problem is solved by adding one or more infrared-dark channels to the multi-channel image as described in the following.

Prior to providing the multi-channel image to the second (semantic segmentation) neural network, the computer system derives at least one infrared-dark channel of the multi-channel image. In other words, the multi-channel image is further enhanced by one or more infrared-dark channels. Thereby, the infrared-dark channel values for each pixel are based on the value of the NIR channel and the minimum value of the available R-, G-, B-channel(s) and NIR channel for the respective pixel.

Two different infrared-dark channels can be advantageously computed to improve the original multi-channel image. In one embodiment, an infrared-dark subtractive channel is computed which represents for each pixel of the multi-channel image the difference between the NIR channel value and the minimum value of the available R-, G-, B-channel(s), and NIR channel of the respective pixel. In another embodiment, an infrared-dark ratio channel is computed which represents for each pixel the ratio of the NIR channel value to the minimum value of the available R-, G-, B-channel(s), and NIR channel of the respective pixel. To avoid a division by "0", the minimum value is added to a predefined offset value. The multi-channel image may be enhanced by adding any one of the infrared-dark subtractive channel, infrared-dark ratio channel, or both infrared-dark channels.

There are two implementations to generate the infrared-dark channel(s). In a first implementation, the infrared-dark channel(s) are generated (computed) by applying respective mathematical operations to the estimated NIR channel. In a second implementation, the first (semantic regression) neural network is trained to derive the infrared-dark channel(s) together with the NIR channel.

The addition of one or more of the infrared-dark channels leads to a more robust segmentation of images showing damaged plant elements. The second neural network when being trained with such enhanced multi-channel images recognizes damaged plant parts as pixels belonging to plants with high reliability and accuracy. This leads to more realistic vegetation coverage maps of the real-world scenery.

Accurate automatic vegetation coverage map segmentation of the vegetation present in an RGB image of a real-world scenery (e.g., an agricultural field, a forest, a golf course, etc.) can allow extracting precise biological information about plants. For example, the crop status of crop in field or of trees in a forest can be derived from such information. Traditionally, normalized difference vegetation index (NDVI) and NIR channel have been a good indicative of the vegetation presence. However, the use of these channels typically requires a dedicated NIR camera that is often not available for most applications such as low-cost or smart-phone based devices. Further, the NDVI based methods fail segmenting vegetation where damage is present, and the NIR based methods fail segmenting vegetation where heterogeneous illumination prevails. The herein disclosed approach provides an end-to-end method for robust and reliable vegetation segmentation over RGB images without the need of an infrared capable camera.

In particular the embodiments using infrared-dark channels in the multi-channel image are advantageous in that such channels correlate with the presence of vegetation on an image pixel such that it is robust to illumination changes and the damage degree of the vegetation. The proposed infrared-dark channels present greater separability (histogram intersection) between vegetation and non-vegetation pixels than images using just the traditional NIR or NDVI channels.

In one embodiment, the segmentation neural network can be further extended to segment pixels associated with plant elements into multiple plant classes with each plant representing a particular plant species. In this embodiment, a further semantic segmentation (third) neural network may be used which is trained to segment the multi-channel image into pixels associated with different plant species for such areas which have been identified as pixels associated with plants in the vegetation coverage map provided by the second neural network.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

SHORT DESCRIPTION OF THE FIGURES

FIG. 1 includes a block diagram of a computer system for estimating vegetation coverage in a real-world environment according to an embodiment;

FIG. 7 shows a comparison of results for vegetation coverage map estimation for different channel combinations;

Figure 8:
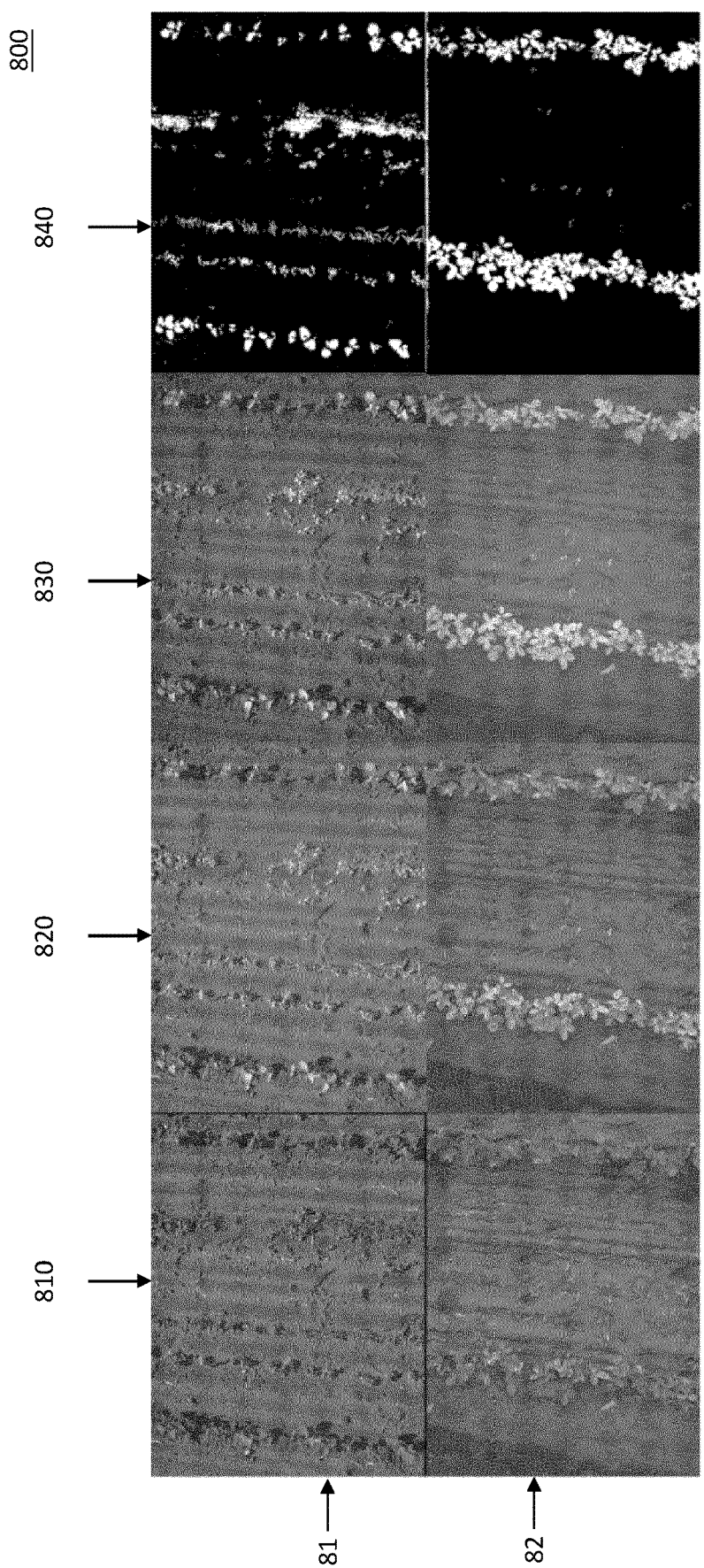
Figure 9:
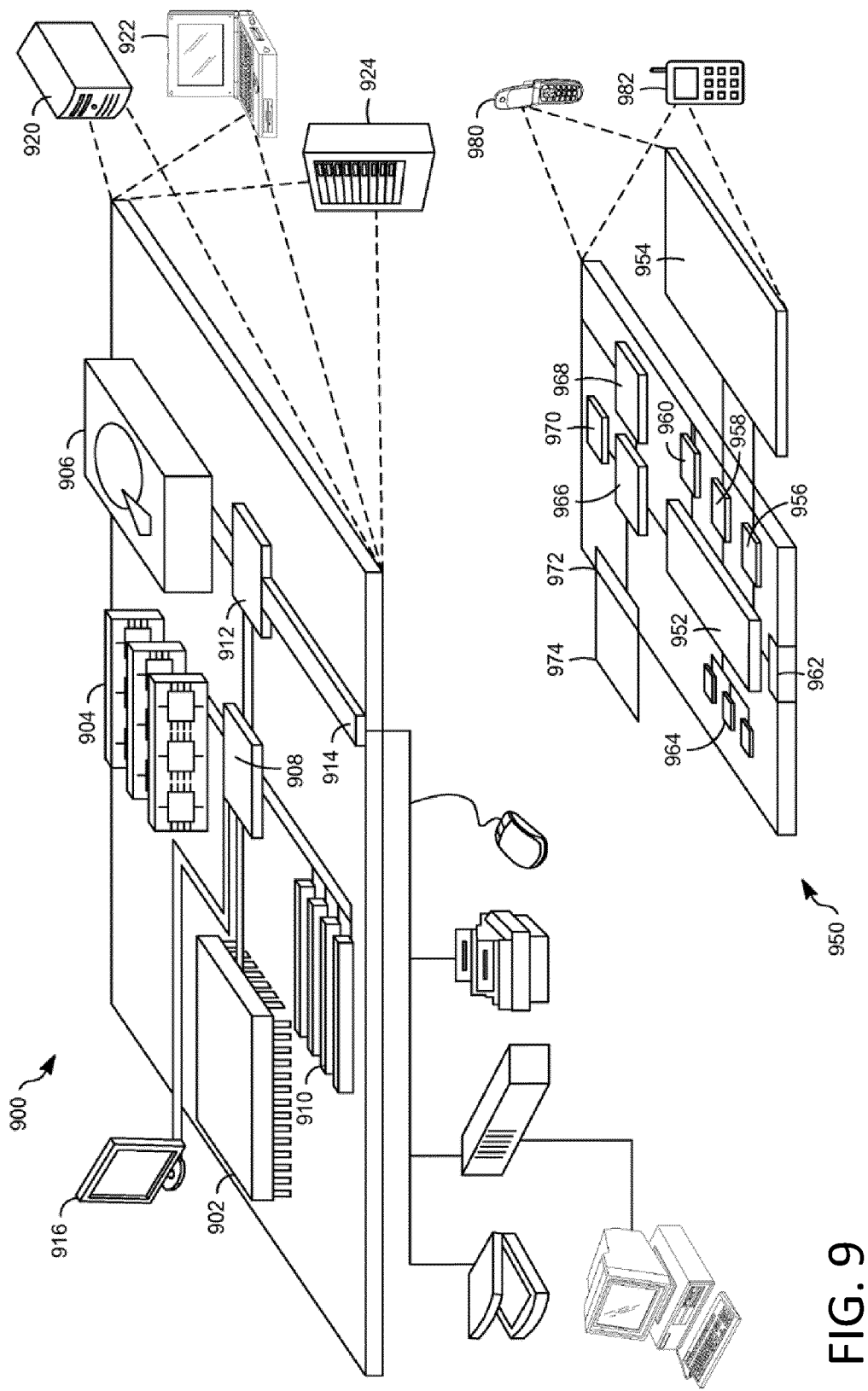

FIG. 8. illustrates two examples of multispectral training image data with corresponding ground-truth of plant coverage; and FIG. 9 is a diagram that shows an example of a generic computer device and a generic mobile computer device, which may be used with the techniques described herein.

DETAILED DESCRIPTION

Figure 1:
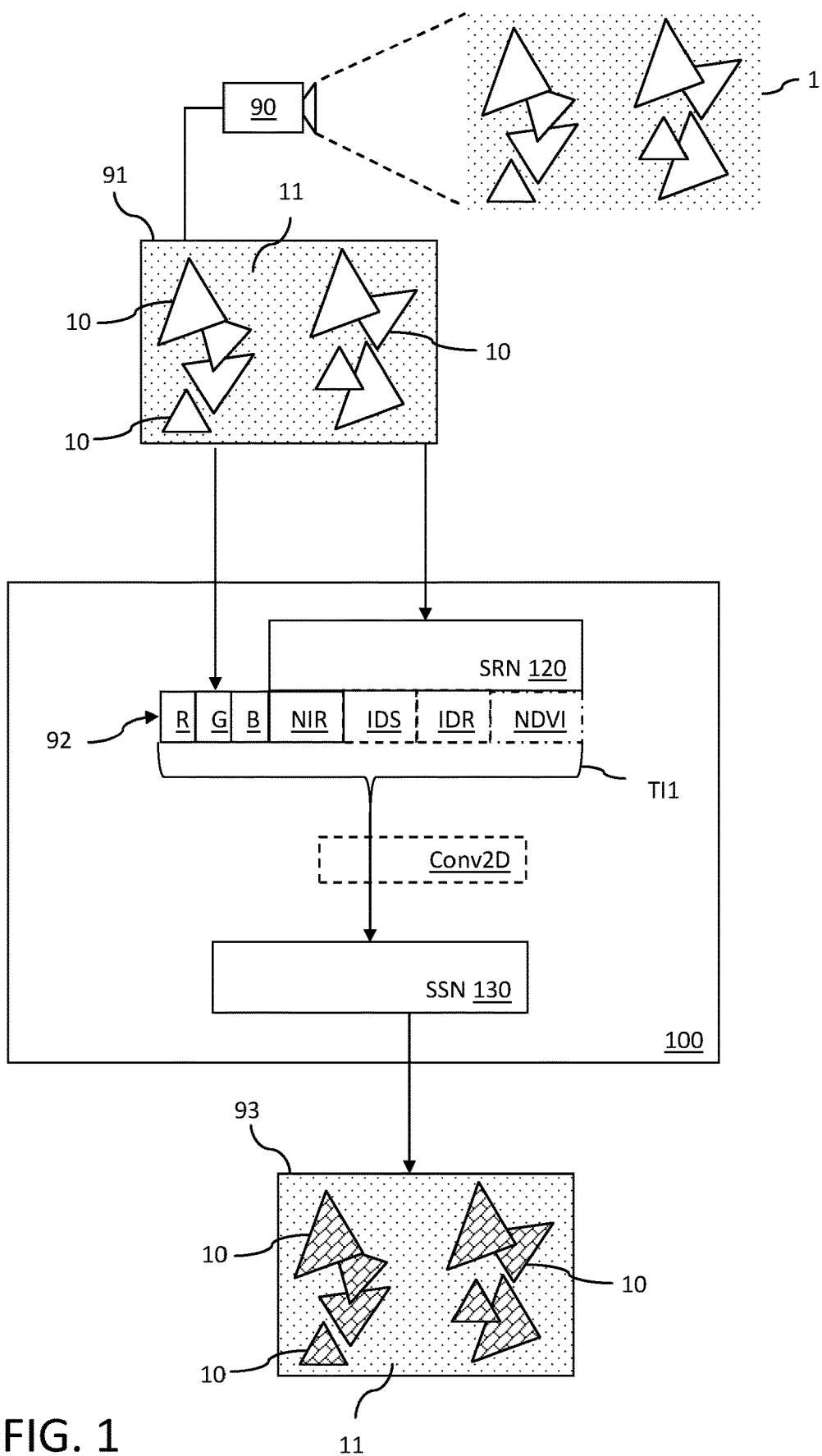
Figure 2:
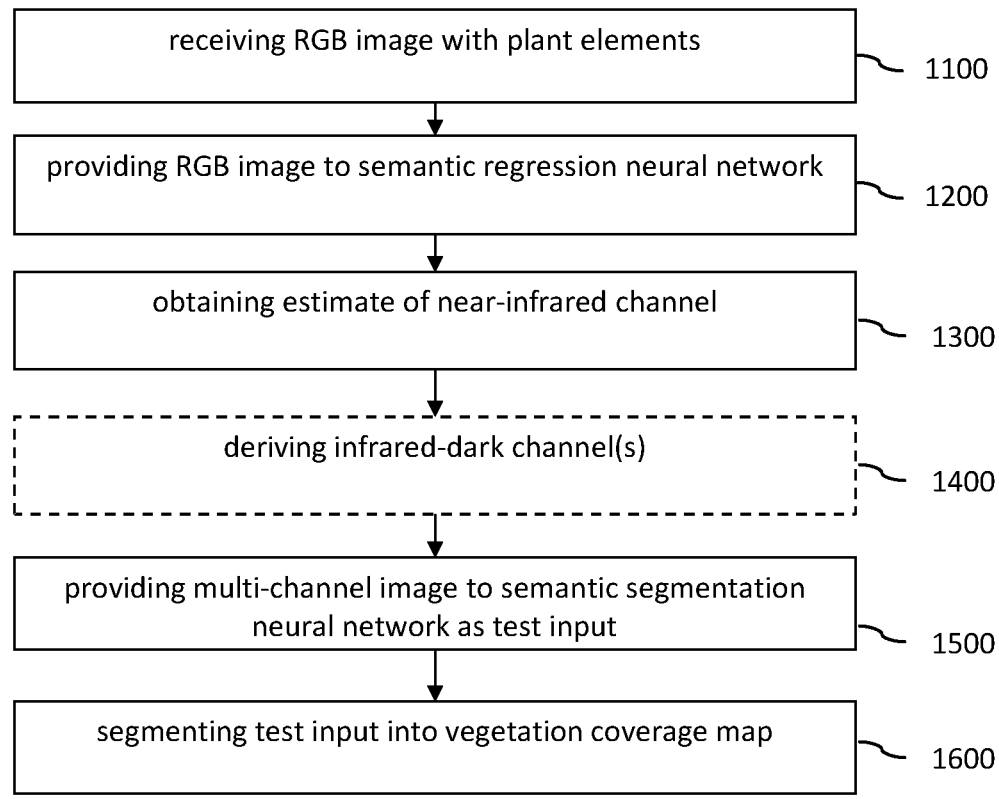
FIG. 2 is a simplified flowchart of a computer implemented method for estimating vegetation coverage in a real-world environment according to an embodiment.

FIG. 1 includes a block diagram of a computer system 100 for estimating vegetation coverage in a real-world environment. FIG. 2 is a simplified flowchart of a computer implemented method 1000 for estimating vegetation coverage in a real-world environment. The method 1000 may be executed by the computer system 100 when running a respective computer program which implements the modules of the computer system 100. The computer system 100 is now described in the context of the computer-implemented method 1000 with using the reference numbers of both figures.

An RGB image 91 of a real-world scenery 1 is recorded by an appropriate RGB camera device 90. The triangle symbols in the scenery 1 represent plant elements (e.g., leaves, stems, etc.) of plants (e.g., crop, weeds, trees, etc.) growing in the scenery 1. The camera device can be any digital camera device which provides RGB images. This includes all devices with integrated camera functions (e.g., smart phones or tablet computers). The RGB image 92 therefore includes pixels which represent plant elements 10 and includes pixels which represent non-plant parts 11 (e.g., soil, water, etc.) of the scenery. It is to be noted that pixels belonging to plant elements may be associated with only one plant species or with different plant species, dependent on the situation in the real-world scenery. Advantageously, the image is recorded from a zenithal view so that a substantial part (plot or scenery) of the real-world environment is represented by the RGB image.

The RGB image 91 is received 1100 by the computer system 100 via an appropriate interface. For example, the communicative coupling between the camera 90 and the system 100 may be achieved via a wired connection or via a wireless connection. Thereby, an RGB image has three channels—a red channel R, a green channel G, and a blue channel B. The following example uses all RGB channels for NIR estimation and vegetation coverage prediction. However, a person skilled in the art can apply the method also by using only a subset of the RGB channels of the RGB image.

The RGB image 91 is then provided 1200 to a semantic regression neural network (SRN) 120 of the system 100. SRN 120 is trained to estimate at least a near-infrared channel NIR from the RGB image 91. SRN 120 has a topology based on a convolutional segmentation neural network with its last layer being substituted by a monotonic activation function and its loss function being substituted by a regression loss function. Convolutional segmentation networks are well known in the art and a person skilled in neural networks can perform such substitutions without major efforts. When training SRN 120, the neural net learns a pixel-wise regression transformation that transforms any RGB image from an R+G+B domain to a target domain comprising at least a near-infrared domain.

Examples for possible regression loss functions are: Mean Square Error (also known as Quadratic loss or L2 Loss), Mean Absolute Error (also known as L1 Loss), Huber Loss (also known as Smooth Mean Absolute Error), Log-Cosh Loss, and Quantile Loss. A comprehensive explanation of such regression loss function examples is available in the article "5 Regression Loss Functions All Machine Learners Should Know", Prince Grover, Jun. 5, 2018, available at https://heartbeat.fritz.ai/5-regression-loss-functions-all-machine-learners-should-know-4fb140e9d4b0. Each regression loss function can be used with any of the monotonic activation functions: linear, sigmoid or hyperbolic tangent.

In an example embodiment, a fully convolutional DenseNet architecture was employed as baseline network. This network combines the descriptive power from traditional segmentation networks based on fully convolutional versions of classification ones such as SegNet where the accuracy on the border detection is provided by the skip connections on the U-Net segmentation network. The last layer of this network has been substituted by a linear activation function and the loss function has been substituted by a mean absolute error in order to learn a pixel-wise regression transformation that translates the image from the source to the target domain. The image passes through a subsequent set of convolutional operations and max-pooling operations that reduce the spatial dimension of the signal while increasing the descriptive part gradually. This ends up to a descriptor image. A second stage is composed by a set of convolutional filters and upsampling layers that recover the spatial resolution of the input image on the desired domain. To be able to recover the input image high level details, the network makes use of skip connections that transfer the low-level features and spatial information from the source domain into the detailed reconstruction of the target domain. A final N channel layer with a sigmoid layer activation performs the final reconstruction of the NIR.

The network was trained by minimizing a mean absolute error loss function which can be enhanced by an adversarial perceptual loss function following a pix2pix architecture. The addition of the perceptual adversarial loss functions ensures that the generated image is visually plausible and the estimated image cannot be distinguished from a real image by a specifically trained network.

In an example implementation the following training set up was used. The training data set of RGB images showed real-world sceneries with thirteen vegetal species:

three crops: GLXMA (*Glycine max*),HELAN(*Helianthus annuus*),ZEAMX(*Zea mays*), seven broad leaf species: ABUTH(*Abutilon theophrasti*), AMARE(*Amaranthus retroflexus*), CHEAL(*Chenopodium album*), DATST(*Datura stramonium*), POLCO (*Fallopia convolvulus*), POROL(*Portulaca oleracea*), SOLNI(*Solanum nigrum*), and three grass species: DIGSA(*Digitaria sanguinalis*), ECHCG(*Echinochloa crus-galli*), SETVE(*Setaria verticillata*).

84 plots were planted combining the presence of the different species. Each plot followed a different weed control treatment in order to generate damage on the different species. Two pictures per day were taken per plot by a Micasense RedEdge MX camera during 28 days. This camera has five different sensors: blue (450 nm), green (560 nm), red (650 nm), red-edge (730 nm) and NIR (840 nm) and delivered 1280×920 pixel images. The RGB- and NIR channels of the camera were used to provide the training images of the training dataset. As each image band was taken by a different monochrome sensor, acquired images were co-registered by applying the affine transformation that minimized the Mattes mutual information loss minimization between channels. In other words, the R-, G- and B-channels of the used multispectral camera were not the normal RGB channels as provided by a smart phone or a digital single-lens reflex camera (DLSR) camera but cover a much narrower band of RGB. To enable SRN 120 to process RGB images recorded by standard RGB cameras, the RGB channels of the used multispectral camera were transformed into standard DLSR channels (real sRGB values) by multiplying the multispectral channels with a matrix:
[R_DLSR, G_DLSR, B_DLSR]'=A*[R_SPECTRAL, G_SPECTRAL, B_SPECTRAL]', where A is a 3×3 matrix containing the contribution of each R_SPECTRAL, G_SPECTRAL, B_SPECTRAL into the R_DLSR, G_DLSR, B_DLSR channels.

Figure 2A:
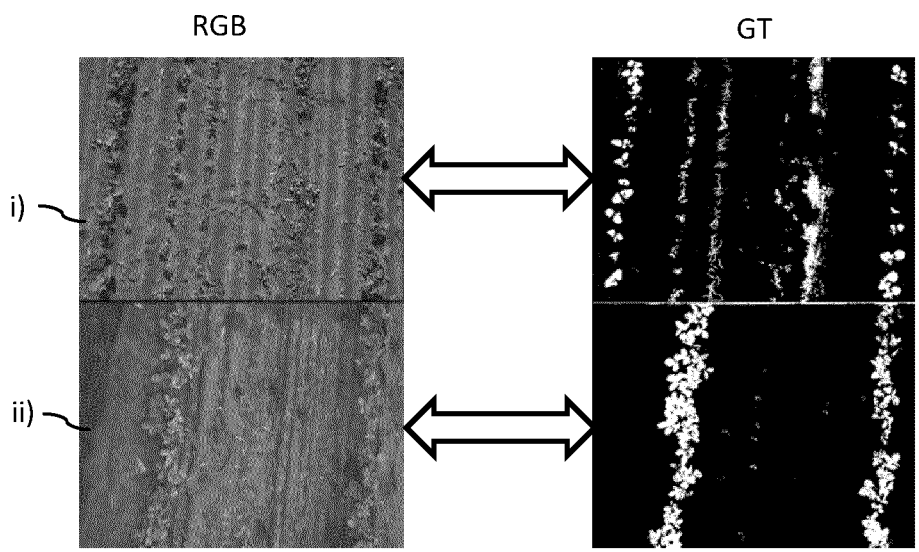
FIG. 2A shows two example training images with respective ground truths.

From the registered images, images were randomly chosen and the vegetation coverage was manually segmented. FIG. 2A shows two RGB training images i, ii of the acquired plots on the left hand of the figure. On the right hand, the associated ground truth images are shown which are the result of the manual segmentation (annotation) into plant and non-plant related pixels. To avoid biasing, training, validation and testing datasets were selected plot-wise. 80% of the plots were randomly chosen for training whereas the 20% remaining were distributed into validation sets (10%) and testing sets (10%). All pictures were incorporated to the set determined by their plot number.

Figure 5:
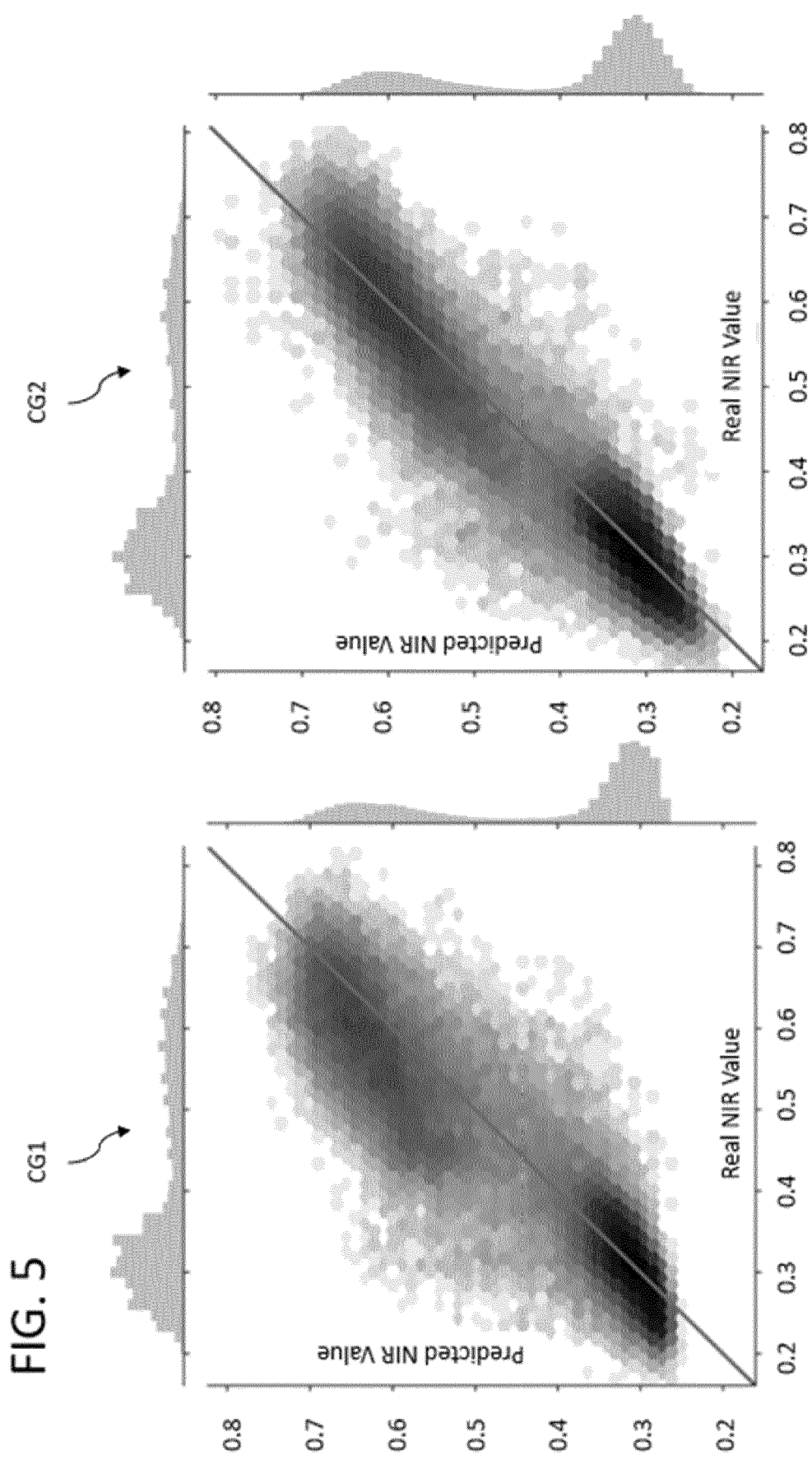
FIG. 5 illustrates regression graphs between real and predicted NIR values for two different embodiments using different loss functions.

In more detail, training was performed over 224×224 pixel tiles that were extracted randomly from the full-size images during 100 epochs. The tiles are fed into the neural network. The Adam classifier [cf. Diederik P. Kingma and Jimmy Lei Ba. Adam: A method for stochastic optimization. 2014. arXiv:1412.6980v9] was employed for training and the learning rate was set to 10-5. A reduction of the learning rate is performed when the loss function value on the validation data set raises or stagnates. Obtained regression results are summarized in FIG. 5. The correlation graph CG1 on the left hand shows the real NIR values (as obtained by a NIR camera sensor) and the estimated (predicted) NIR values for the above described example embodiment, based on a fully convolutional DenseNet architecture a linear activation function using a mean absolute error loss function. The correlation graph CG2 on the right hand shows the real NIR values (as obtained by a NIR camera sensor) and the estimated (predicted) NIR values in the embodiment where the mean absolute error loss function is enhanced by an adversarial perceptual loss function following the earlier mentioned pix2pix architecture. It can be appreciated that the use of the pix2pix based adversarial loss contributes not only to generate more plausible images but also reduces the error (difference) between the predicted and real NIR images, and reduces the regression loss. A plausible image, as used herein, is an imaged that reflects reality. For example, blue leaves of a crop plant would not be considered to be plausible.

Figure 4A:
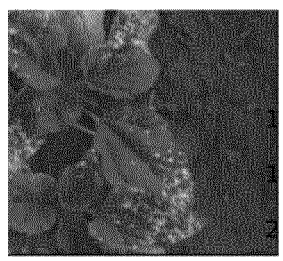
FIG. 4A illustrates two examples of NIR channel derivation from RGB images according to an embodiment.
Figure 4A:
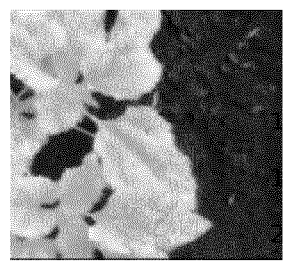
Figure 4A:
Figure 4A:
Figure 4A:
Figure 4A:
Figure 4B:
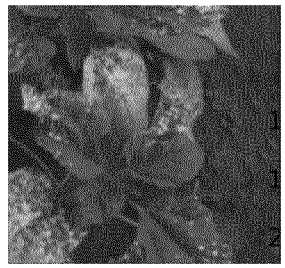
FIG. 4B illustrates two examples of NIR channel derivation from RGB images according to an alternative embodiment.
Figure 4B:
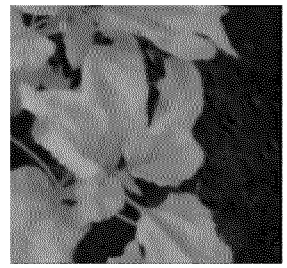
Figure 4B:
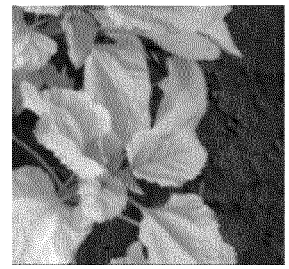
Figure 4B:
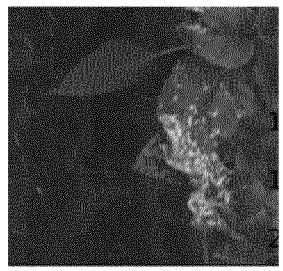
Figure 4B:
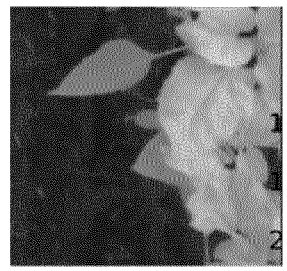
Figure 4B:
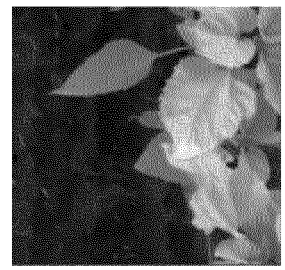

FIGS. 4A and 4B show examples of predicted NIR channel images which have been generated with the two embodiments. In FIG. 4A, NIR prediction was made with SRN 120 using only the mean absolute error loss function whereas in FIG. 4B, the prediction was made with the enhanced pix2pix based adversarial loss function. Both figures show three columns with the images in column 1) showing the original RGB images (in black and white), column 2) showing the predicted NIR channel images and column 3) showing the corresponding ground-truth images. In all original RGB images f1, g1, h1, i1 the plant elements show damages (bright spots). The predicted NIR channel images f2, g2 of the basic embodiment without the enhanced loss function show dark areas on the plant elements where the damage spots are located and are still quite different from their respective ground-truth images f3, g3. The predicted NIR channel images h2, i2 of the enhanced loss function embodiment show entirely smooth structures for all pixels associated with plant elements. The predicted NIR channel images h2, i2 are already very similar to the respective ground-truth images h3, i3.

Figure 3A:
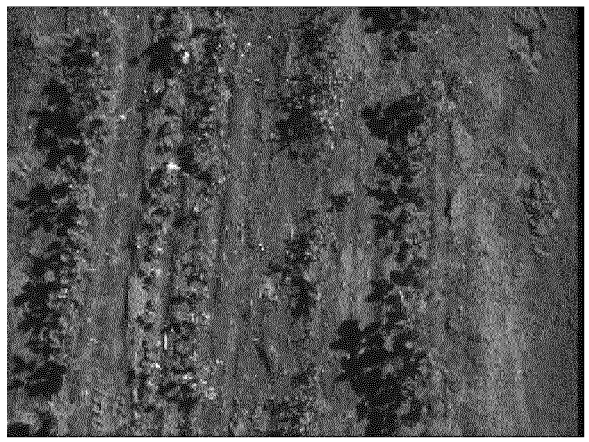
FIGS. 3A, 3B illustrate different channels of two example multi-channel images.
Figure 3A:
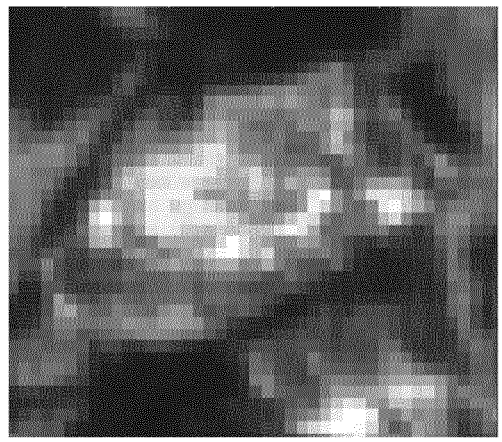
Figure 3A:
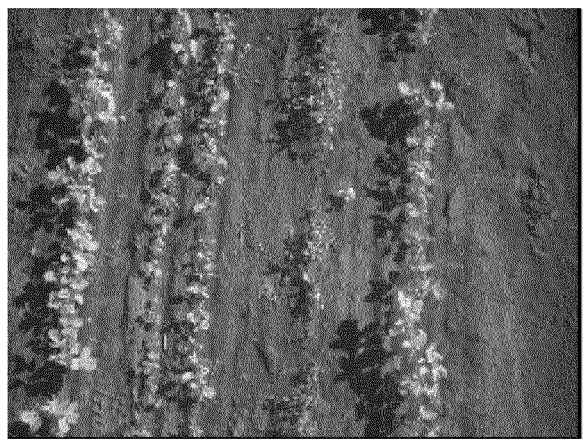
Figure 3A:
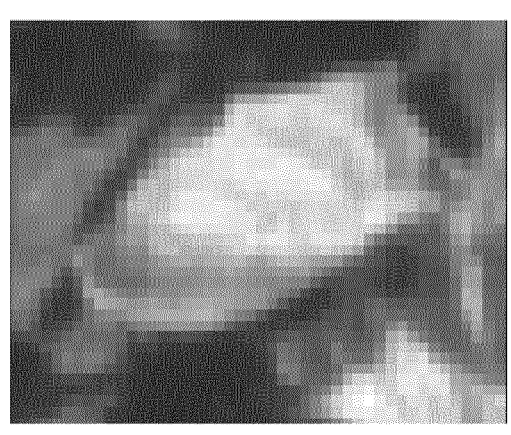
Figure 3A:
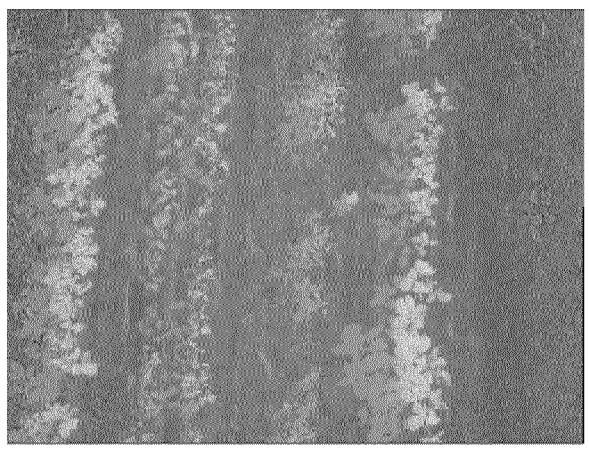
Figure 3A:
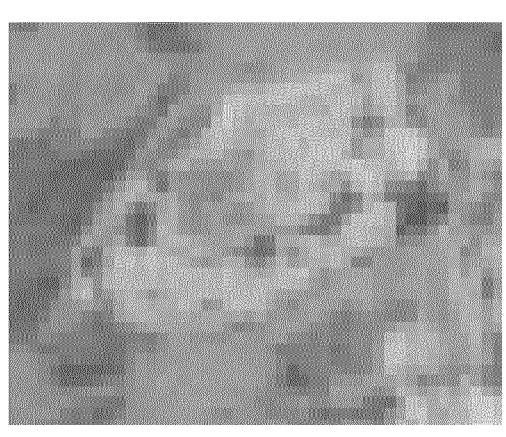
Figure 3B:
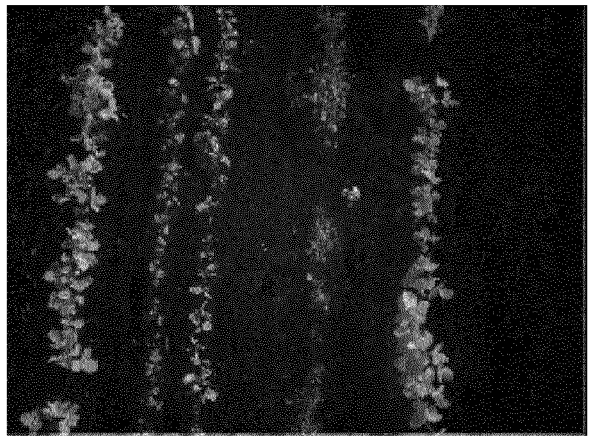
Figure 3B:
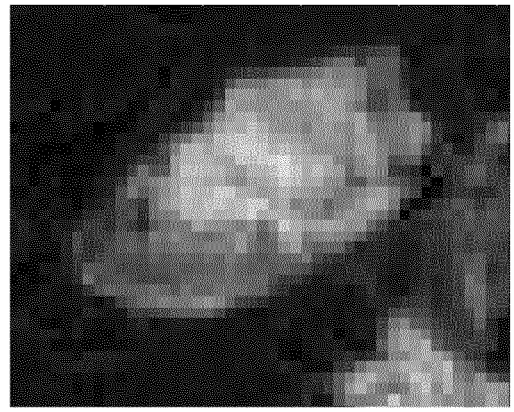
Figure 3B:
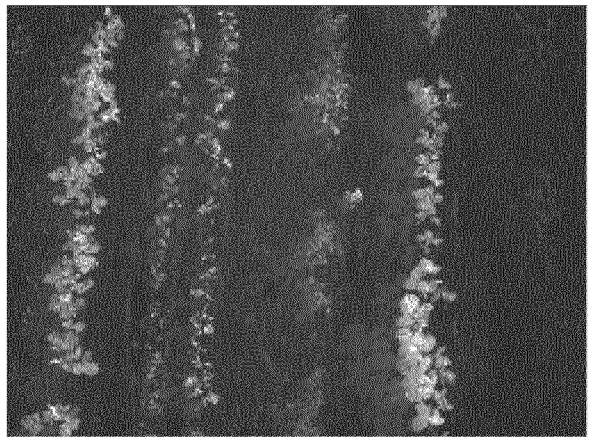
Figure 3B:
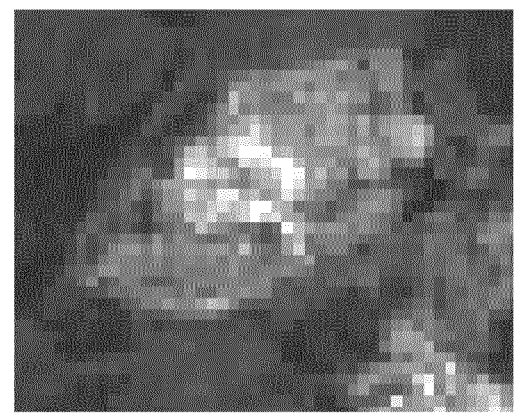

Turning back to FIG. 1, the trained SRN 120 is then applied to the received RGB image 91 to obtain 1300 an estimate of the NIR channel. It is to be noted that there is no need to use a multispectral camera for providing the RGB images which serve as test inputs to the first neural network. Typically, a simple smartphone camera or DLSR camera may be used to record the RGB images to be analyzed. Turning briefly to FIG. 3A, row a* illustrates two examples of RGB images a1, a2 (illustrated as black and white picture) as received by SRN 120. Thereby, a2 shows a zoomed portion of a1. Row b* illustrates the corresponding estimated NIR channel images b1 and b2. The other rows of FIGS. 3A, 3B show further derived channels which will be described further down below.

The R-, G-, B-channels of the originally received RGB image and the estimated NIR channel are then provided 1500 as a test input TI1 to a semantic segmentation neural network SSN 130. These four channels form the multi-channel image 92. The SSN 130 has been trained before with a training data set comprising such multi-channel images of the test input type to segment the test input TI1 into pixels associated with plant elements and pixels not associated with plant elements.

SSN 130 has a similar structure as SRN 120. In an example embodiment, the input layer of SSN 130 is of size M×N×K, where M and N represent the width and height of the input image, and K represents the number of channels used. In an embodiment with R- G-, B- and NIR channels the number of input channels is K=4. Even less channels, such as for example, a R-NIR combination (K=2) or a R-G-NIR combination (K=3) or other sub-combinations may be used. In more advanced embodiments, the number of channels can reach K=7 as explained further down below. In general, the channels are composed by the R-, G-, B-channels of the original RGB image and all estimated channels of the multi-channel image. The final layer of SSN 130 is composed by two output channels of size M and N (M×N×2) resembling the original size of the image. One output channel contains the estimate for the vegetation coverage segmentation and the other contains the estimate for non-vegetation (non-plant) classes. This is followed by a softmax activation layer that ensures the mutually exclusiveness of the two classes. SSN 130 may be minimized over a categorical cross-entropy loss function. Other segmentation loss functions, such as for example, weighted categorical cross-entropy, balanced cross-entropy, Focal loss, Focal loss plus Dice loss, Tversky loss, or Lovász-Softmax, or any appropriate combination thereof may also be used by a skilled person for training the semantic segmentation neural network.

The application of SSN 130 to the received test input TI1 segments 1600 the test input into pixels associated with plant elements 10 (vegetation class) and pixels not associated with plant elements 11 (non-vegetation class). The result of the segmentation is a so-called vegetation coverage map 93.

In one embodiment, system 100 may also derive the normalized difference vegetation index as a further channel NDVI from the R- and estimated NIR channels. The NDVI channel is widely used for vegetation-soil discrimination and is well known by the skilled person. In this embodiment, the NDVI channel forms part of the multi-channel image which serves as test input TI1 to SSN 130.

In an advantageous embodiment, the computer system 100 can further derive 1400 at least one infrared-dark channel IDS, IDR of the multi-channel image prior to providing 1500 the multi-channel image 92 to SSN 130. In other words, the multi-channel image 92 is enhanced by one or two infrared-dark channels. The infrared-dark channel values for each pixel are based on: the value of the NIR channel and the minimum value of the R-, G-, B-channels and NIR channel for the respective pixel.

A first infrared-dark channel—the infrared-dark subtractive channel IDS—represents for each pixel the difference between the NIR channel value and the minimum value of the R-, G-, B-, and NIR channels of the respective pixel. The IDS channel can be described by the following formula: IDS=NIR—min(R; G; B; NIR). Examples of derived IDS channel images are illustrated in row d* of FIG. 3B with IDS image d1 associated with the RGB image a1 and IDS image d2 associated with RGB image a2.

A second infrared-dark channel—the infrared-dark ratio channel IDR— represents for each pixel the ratio of the NIR channel value to the minimum value of the R-, G-, B-, and NIR channels of the respective pixel. To avoid division by "0", the minimum value is added to a predefined offset E as described by the following formula: IDR=NIR/(min(R; G; B; NIR)+ε). Examples of derived IDR channel images are illustrated in row e* of FIG. 3B with IDS image e1 associated with the RGB image a1 and IDS image e2 associated with RGB image a2.

In one embodiment, the system 100 uses a computation module which derives the one or more infrared-dark channels by applying respective mathematical operations to the estimated NIR channel which was obtained by the application of SRN 120 to the original RGB image 91.

In an alternative embodiment, SRN 120 is trained in such a way that it automatically derives the at least one infrared-dark channel together with the NIR channel as an output of SRN 120.

In one embodiment, system 100 implements an optional Conv2D layer (cf. FIG. 1) which can be applied to the multi-channel image 92 before it is further processed by SSN 130. The Conv2D layer implements a filter function which can be advantageous to make use of pretrained weights (defining pre-trained filters) or training the neural networks. In general, typically neural networks for processing RGB color images take advantage of pre-trained initial weights obtained from training such neural networks over natural images datasets such as Imagenet. Such datasets allow the neural network to have an initial set of parameters for the backbone which allows the neural network to encode RGB images. Such initial weights can define a good parameter starting point for the neural network. Unfortunately, these initial weights cannot be used for extended images such as the multi-channel image 92. To overcome, the optional additional convolutional layer Conv2D may be used which implements three filters of size (1,1). When convolving these filters over the image 92 a three-channel image is obtained that is compatible with the pretrained filters. The specific filters of the network are calculated during the model training.

Figure 6:
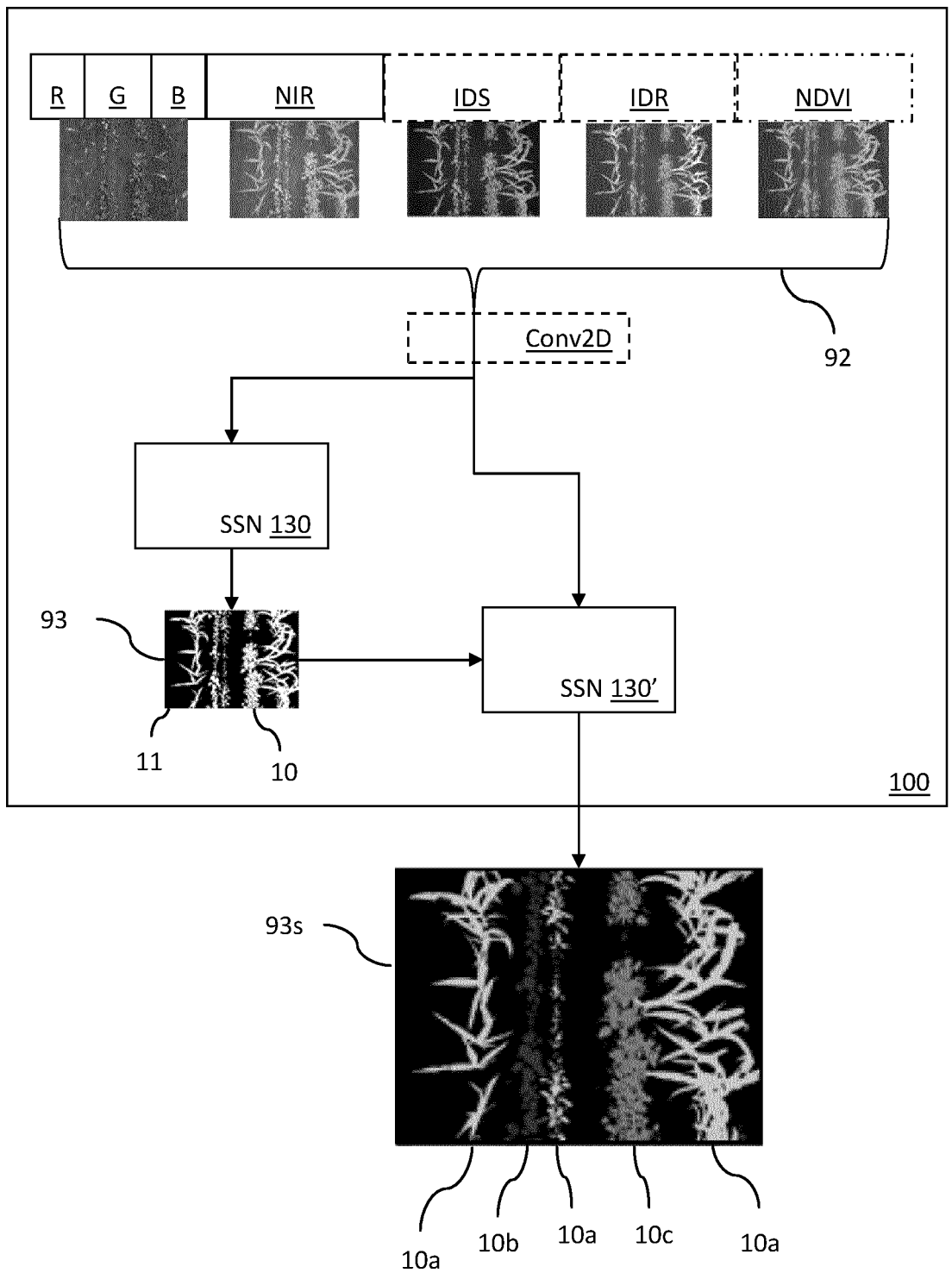
FIG. 6 illustrates a block diagram of a computer system for estimating vegetation coverage in a real-world environment according to an embodiment with plant species recognition.

FIG. 6 is a block diagram of an embodiment of system 100 enhanced by a third (semantic segmentation) neural network SSN 130'. In this embodiment, system 100 provides a vegetation species coverage map 93s which is segmented in accordance with different plant species. The figure shows an example with three different species which are present in the original RGB image. SSN 130' receives as an input the multi-channel image 92 and the vegetation coverage map 93 as provided by SSN 130. The vegetation coverage map 130 can be seen as a mask which separates plant related pixels from non-plant pixels. This mask acts like a filter for the multi-channel image 92 so that SSN 130' can perform the species segmentation on the plant related pixels. This leads to a higher segmentation accuracy and finally results in the vegetation species coverage map 93s. In the example, the map 93s is segmented into the three plant species 10a, 10b and 10c.

SSN 130' can be implemented as an extension of a segmentation network. For example, a standard segmentation network such as a standard PSPNet for semantic segmentation (cf. H. Zhao, J. Shi, X. Qi, X. Wang, and J. Jia, "Pyramid scene parsing network," in Proceedings of the IEEE conference on computer vision and pattern recognition, pp. 2881-2890, 2017") relies on a two stage training process with generating initial results by supervision with an intermediate segmentation loss, and a second step learning the residue afterwards with a final loss. Thus, optimization of the standard PSPNet is decomposed into two optimization tasks with each optimization task being simpler to solve.

SSN 130' is extended vs. such standard segmentation networks in that the input relies on the different input channels of the multi-channel image 92 complemented by the vegetation coverage map 93 as provided by SSN 130. The combination of the additional input channels 92 with the vegetation coverage map 93 allows a more accurate segmentation by species.

For example, a single RGB image is taken from a common color camera. The NIR channel is estimated by the use of the semantic regression neural network as described earlier. Derived channels may be output directly by the RGB2NIR network (if learned accordingly), or may be computed by mathematical calculations by using corresponding vegetation index formulas. The original RGB- and the derived channels are then composed into a multi-channel image 92 that feeds the semantic segmentation neural network SSN 130 to generate the vegetation coverage map 93 which is then aggregated with the multi-channel image 92 into a new channel forming the input image for the third neural network SSN 130' to perform species segmentation. The input to SSN 130' is of size (M×N×K+1), where M and N are the width and height of the input image and K+1 refers to the original R-, G- and B-channels of the image, the estimated NIR- and estimated optional IDCS-/IDCR-/NDVI-channels, and the estimated vegetation segmentation map 93.

In an analysis of the suitability of the proposed channels (vegetation indices) for vegetation coverage map estimation the separability of the different vegetation indices values was measured among the two classes vegetation and non-vegetation.

On the one hand, the intersection over the indices' values probability density function of the vegetation and the non-vegetation classes was determined. This metric measures the existing overlap between the distribution of the intensity values for the two classes, showing an intersection of 0:0 for a perfect separability among the classes whereas a value of 1:0 indicates a full overlap among classes. On the other hand, the Area Under Curve Metrics (AUC) of a hypothetical Naïve Bayes classifier applied over the different vegetation indices for the different pixels was determined. This curve measures the true positives rate against the false positives rate. An ideal classifier will present a ROC value of 1.0 whereas a random classifier will arise to a ROC value of 0.5.

TABLE 1

AUC and histogram intersection values obtained by the different image vegetation indices or channels for each image of the entire dataset:

| Image Channel | AUC (average) ±std | Intersection ±std |
|---|---|---|
| r | 0.872 ± 0.085 | 0.463 ± 0.132 |
| g | 0.666 ± 0.108 | 0.551 ± 0.230 |
| b | 0.736 ± 0.110 | 0.601 ± 0.117 |
| cie-L | 0.678 ± 0.113 | 0.586 ± 0.172 |
| cie-a | 0.937 ± 0.049 | 0.257 ± 0.173 |
| cie-b | 0.740 ± 0.089 | 0.298 ± 0.213 |
| NIR | 0.916 ± 0.071 | 0.551 ± 0.189 |
| NDVI | 0.989 ± 0.008 | 0.261 ± 0.081 |
| IDS | 0.998 ± 0.002 | 0.166 ± 0.126 |
| IDR | 0.997 ± 0.004 | 0.198 ± 0.120 |

Table 1 shows the average results and standard deviation obtained with each vegetation index channel (column "Image Channel". It can be appreciated that NIR, NDVI, and cie-a channels are appropriate vegetation indices for vegetation coverage estimation with AUC values of 0.916, 0.989 and 0.937, respectively (column "AUC (average) ±std"). However, the proposed IDS channel obtains an AUC value of 0.998 with a histogram intersection value of 0.166 (column "Intersection ±std2). These improved values can be achieved because the IDS channel is more robust to damage of plants and to non-homogeneous image illumination.

FIG. 7 shows a comparison 700 of results for vegetation coverage map estimation for different channel combinations used by the embodiment of FIG. 6. The system in this example was trained using a training image data set including image data as shown by example in FIG. 8. FIG. 8 illustrates two examples 81, 82 of multispectral image data with corresponding ground-truth 840 of plant coverage. Column 810 shows two RGB image examples (in black and white). Column 820 shows the corresponding red-edge images, and column 830 shows the corresponding NIR images. As already described earlier, training was performed over 224×224 pixel tiles that were extracted randomly from the full-size images during 30 epochs. The tiles are fed into the near infrared estimation regression neural network 120 to derive the estimated NIR channel. Additional vegetation indices (e.g., NDVI, IDS, IDR) are calculated from the R, G, B and estimated NIR channels.

After training, the validation subset of the dataset was used to calculate the optimal thresholds values that maximized the balanced accuracy (BAC). These thresholds were applied over the testing set. Results of the vegetation coverage map estimation over the testing set are depicted on table 700. This table includes the performance analysis for different combinations of input images and the analysis of the performance of the different algorithms. Two metrics are used: 1) The balanced accuracy (BAC), which represents the average value between sensitivity and specificity, and 2) the F-Score that returns the number of correct vegetation pixels divided by the number of all vegetation pixels returned by the model.

The use of the RGB image alone produces a balance accuracy of 0.962 and a F-score of 0.904.

The analysis of the use of a single channel to predict the vegetation coverage map allows to recognized that NDVI and NIR channels show different performance. NDVI and NIR show a reduced performance (F-score of 0.823 and 0.889) for vegetation pixel values with BAC=0.571 and a F-score=0.355, whereas the NIR channel alone produces less accurate results (BAC=0.924, F-score=0.823). The proposed IDS and IDR channels (referred to as IDCS and IDCR in FIG. 8) show better performance than the baseline RGB. The results in table 700 show that the combination of RGB channels with the further proposed index channels lead to better results than the RGB baseline alone. The combination of RGB with the proposed IDR channel obtains the best F-Score with a value of 0.943. Even better results can be achieved when the combining several of the proposed channels. The best results were obtained with the combination of RGB+NIR+IDS+IDR achieving a BAC=0.984 and a F-score=0.952.

FIG. 9 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Ideally, device 900 has a GPU adapted to process machine learning algorithms. Generic computer device 900 may correspond to the computer system 100 of FIG. 1. Computing device 950 is intended to represent various forms of mobile devices, such as personal digital assistants, cellular telephones, smart phones, and other similar computing devices. For example, computing device 950 may be used as a GUI frontend for a user to capture test input images and provide them to the computer device 900, and in turn, receive from the computer device, a segmented image indicating the location(s) of various weed plant and the respective species of the weed plants on the image. Thereby computing device 950 may also include the output device 50 of FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method for estimating vegetation coverage in a real-world environment, the method comprising:
receiving an RGB image of a real-world scenery with one or more plant elements of one or more plant species;
providing at least one channel of the RGB image to a semantic regression neural network, the semantic regression neural network trained to estimate at least a near-infrared channel (NIR) from the at least one channel of the RGB image, the semantic regression neural network having a topology based on a convolutional segmentation neural network with its last layer being substituted by a monotonic activation function and its loss function being substituted by a regression loss function, to learn a pixel-wise regression transformation that transforms any RGB channel from an RGB domain to a target domain comprising at least a near-infrared domain;
obtaining an estimate of the near-infrared channel (NIR) by applying the semantic regression neural network to the RGB image;
deriving at least one infrared-dark channel of a multi-channel image, wherein infrared-dark channel values for each pixel are based on: the value of the near-infrared channel and a minimum value of available R-, G-, B-channels (R, G, B) and the near-infrared channel (NIR) for the respective pixel,
wherein the at least one infrared-dark channel is derived either (i) by applying respective mathematical operations to the estimated near-infrared channel or (ii) by configuring the semantic regression neural network to derive the at least one infrared-dark channel together with the near-infrared channel;
providing the multi-channel image comprising at least one of the R-, G-, B-channels (R, G, B) of the RGB image, and the near-infrared channel (NIR), as test input (TI1) to a semantic segmentation neural network, the semantic segmentation neural network trained with a training data set comprising multi-channel images of the test input type to segment the test input (TI1) into pixels associated with the plant elements and pixels not associated with the plant elements; and
segmenting the test input (TI1) using the semantic segmentation neural network resulting in a vegetation coverage map indicating pixels of the test input associated with the plant elements and indicating pixels of the test input not associated with the plant elements.

2. The method of claim 1, wherein the at least one infrared-dark channel comprises an infrared-dark subtractive channel (IDS) representing for each pixel the difference between the near-infrared channel value and the minimum value of the available R-, G-, B-channels, and the near-infrared channel of the respective pixel.

3. The method of claim 1, wherein the at least one infrared-dark channel comprises an infrared-dark ratio channel (IDR) representing for each pixel the ratio of the near-infrared channel value to the minimum value of the available R-, G-, B-channels, and the near-infrared channel of the respective pixel, the minimum value added to a predefined offset.

4. The method of claim 1, further comprising:
prior to providing the multi-channel image to the segmentation neural network, deriving a normalized difference vegetation channel (NDVI) from the R-and estimated NIR channels, the normalized difference vegetation channel forming part of the multi-channel image.

5. The method of claim 1, wherein the monotonic activation function is selected from the group of: linear, sigmoid or hyperbolic tangent, and wherein the regression loss function is selected from the group of: Mean Square Error, Mean Absolute Error, Huber Loss, Log-Cosh Loss, and Quantile Loss.

6. The method of claim 1, wherein the regression loss function is combined with an adversarial perceptual loss function following a pix2pix architecture where the loss is determined as a weighted sum of the regression loss and the adversarial perceptual loss.

7. The method of claim 1, wherein the segmentation neural network is extended to classify the pixels associated with the plant elements into multiple plant classes with each plant representing a particular plant species.

8. The method of claim 1, wherein the semantic regression neural network is based on a fully convolutional DenseNet architecture.

9. The method of claim 1, wherein the semantic segmentation neural network has an input layer of size M×N×K, where M and N represent the width and height of a test input multi-channel image, and K represents the number of channels of the multi-channel image, and further has a final layer which is composed by two output channels with each output channel of size M and N, one output channel containing the estimate for the vegetation coverage segmentation class and the other output channel containing the estimate for non-vegetation classes, the final layer followed by a softmax activation layer to ensure mutually exclusiveness of the vegetation coverage segmentation class and the class containing the non-vegetation classes.

10. The method of claim 9, wherein the semantic segmentation neural network is minimized over any of the loss functions: categorical cross-entropy loss, weighted categorical cross-entropy, balanced cross-entropy, Focal loss, Focal loss plus Dice loss, Tversky loss, Lovász-Softmax.

11. A computer program product for estimating the vegetation coverage in the real-world environment, the computer program product, when loaded into a memory of a computing device and executed by at least one processor of the computing device, causing the at least one processor to execute the steps of the computer-implemented method according to claim 1.

12. A computer system for estimating the vegetation coverage in the real-world environment, the computer system comprising a memory and at least one processor and further comprising software modules that, when executed by the at least one processor, cause the computer system to perform the steps of the computer-implemented method according to claim 1.

* * * * *